Nov. 18, 1958 L. G. WHEELER 2,860,487
HYDRAULIC POWER UNIT
Filed Feb. 2, 1956 3 Sheets-Sheet 1

INVENTOR.
LLOYD G. WHEELER
BY Lloyd G. Wheeler

ATTORNEY

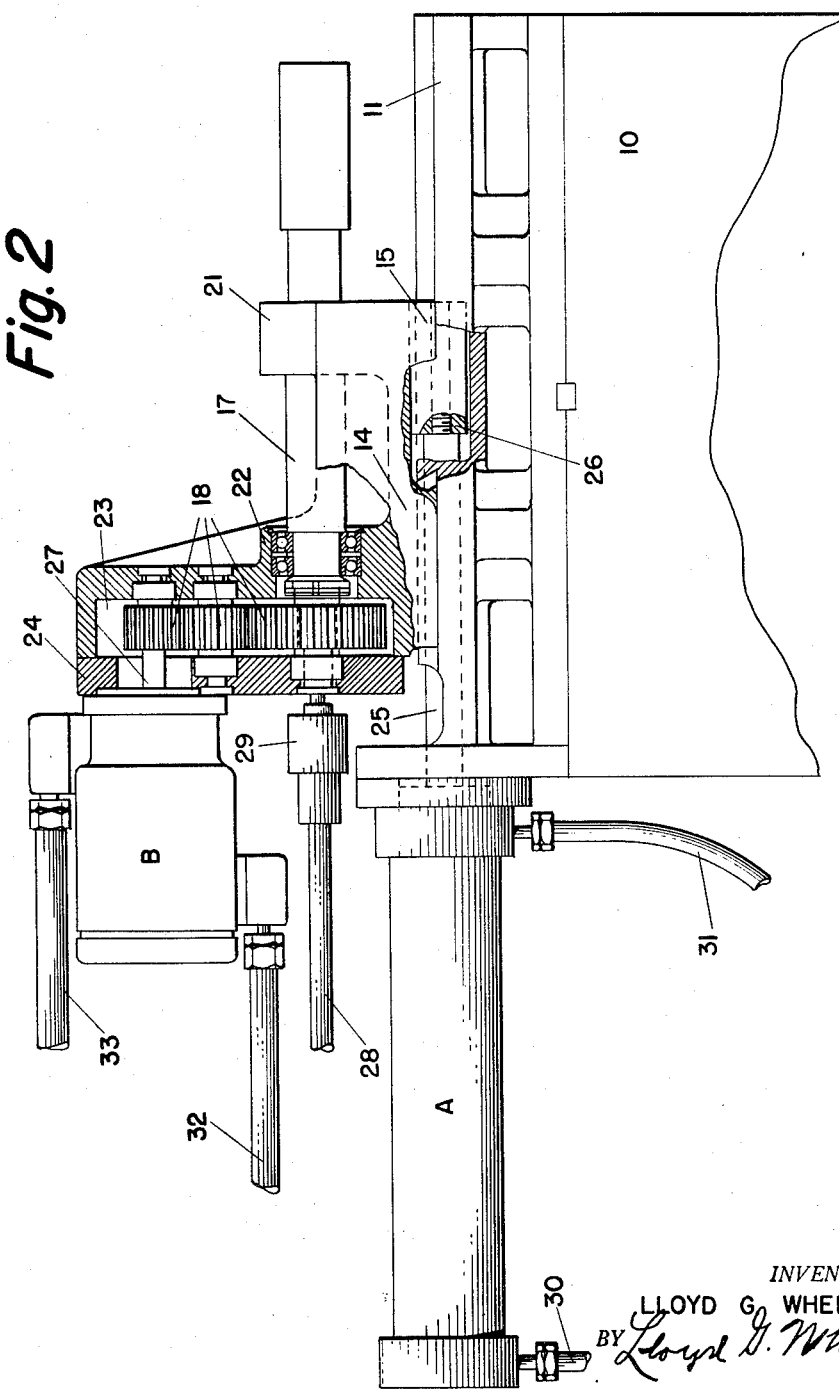

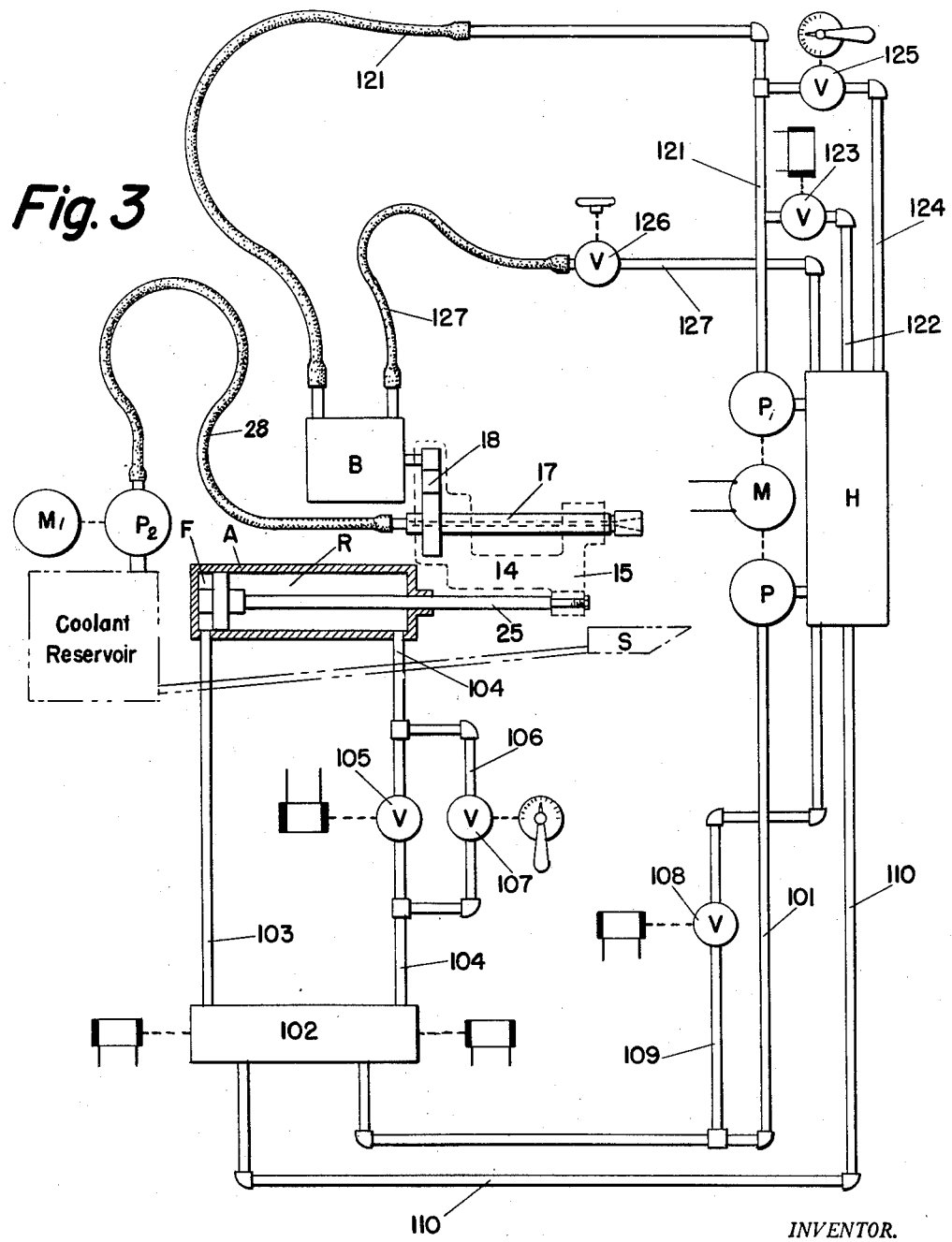

United States Patent Office 2,860,487
Patented Nov. 18, 1958

2,860,487
HYDRAULIC POWER UNIT

Lloyd G. Wheeler, Philadelphia, Pa.

Application February 2, 1956, Serial No. 563,012

4 Claims. (Cl. 60—97)

This invention relates to improvements in hydraulically operated machine tools. In particular the invention is concerned with the physical assembly of fluid motors, and structural elements actuated thereby in a compact unit and to the precise and accurate control of the combined reciprocative and rotative movements of such tools for drilling, boring, reaming and other similar operations.

Basically, the invention comprises a bedplate having its upper surface arranged to receive and guide a support which is reciprocated longitudinally of the bedplate by a first fluid motor which is mounted at one end of the bedplate. The support carries a spindle which extends longitudinally of the bedplate and a second fluid motor is mounted on the support in a plane above the first motor for effecting rotative movement of the spindle and operation of a tool carried thereby. A driving connection is also carried by the support for effecting the rotative movement of the spindle by the second motor. Both fluid motors are operated by a suitable hydraulic medium which is pumped from a hydraulic reservoir to each fluid motor through independent valve control systems and is returned to the reservoir under controlled conditions during operation. The machine is particularly adapted for gun operations and to this end a hollow spindle and hollow tool are used and an independent cutting oil or coolant is circulated therethrough during the drilling, boring, etc. operations.

The physical structure and general design of the machine units of this invention are such that they may be mounted on a foundation in side by side relation in multiples and at any desired angular position with respect to a work piece. The particular fluid motor for rotating the spindle head is a small compact unit, and this motor, the driving connection, the spindle, and the support for these elements are so relatively arranged and comprise such a confined and unitary assembly that a plurality of the machines may be arranged to operate on a workpiece on centers as closely spaced as five inches. The support may be reciprocated by means of a piston type fluid motor and this may be desirable, particularly for short feed or spindle stroke operations, as, for example, those of upwardly of two or three feet. It may, however, be reciprocated by means of a rotating feed screw and this is particularly desirable for longer strokes, as for example, those of the order of sixty inches.

The hydraulic fluid control circuits or systems are arranged to operate at predetermined desired pressures and are arranged to regulate the fluid flow in accordance with actual load or operating conditions in order to provide for efficient use of the machine.

The various structural elements of the machine and the fluid control circuits therefor which comprises the hydraulic fluid motors, control valves, flow compensators, etc. which will be discussed later in detail, are generally commercially available but are so uniquely arranged and organized as to provide an assembled machine unit which has not heretofore been commercially available.

Fig. 2 is an elevational view with portions of the machine shown in detail.

Fig. 3 is a generally diagrammatic view of the fluid circuits with portions of the machine shown in detail.

Figure 1:
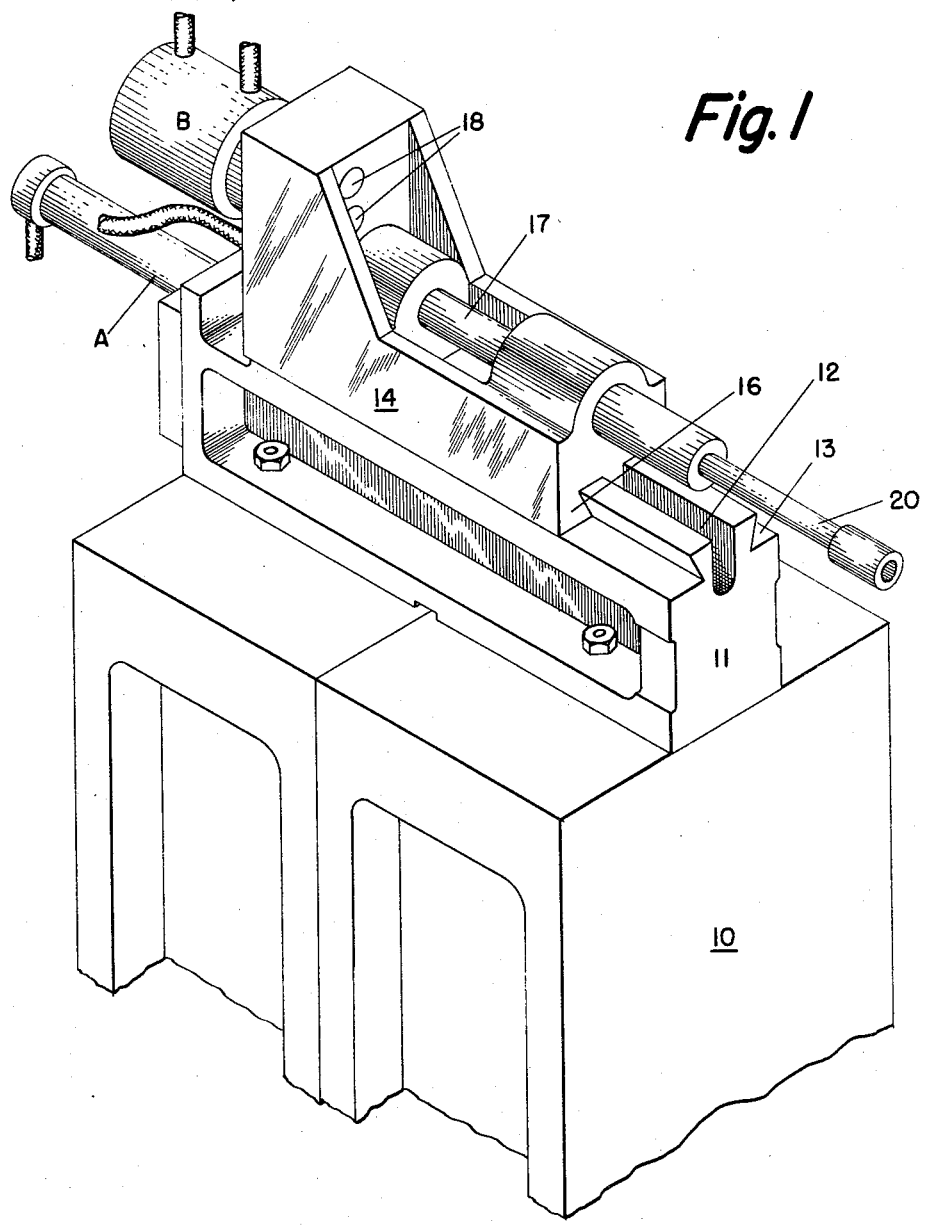
Fig. 1 is a view in perspective showing the various elements of the machine assembled as an operating unit.

In Figures 1 and 2 the numeral 10 indicates a foundation on which the bed plate 11 of the machine is rigidly mounted by removable bolt connections. The upper portion of the bedplate 11 forms a slide surface of general keystone shape having a central U-shaped channel portion 12 and lateral V-shaped grooves or keyways 13 which extend longitudinally of the bed plate. A reciprocative support 14 is provided with a central depending lug 15 which is received in the channel 12 and has lateral V-shaped keys or guides 16 which cooperate with the keyways 13 of the slide. A fluid motor A is fixedly mounted at the rear end of the bedplate 11 and is arranged to reciprocate the support 14. The support 14 carries a fluid motor B, a hollow spindle 17 and a gear train 18 which provides the driving connection with the motor B for effecting rotative movement of the spindle 17. The driving connection may take the form of a driving belt or other desired arrangement. Reciprocative connecting means between the motor A and the support 14 for effecting the reciprocative movement of the support is disposed within the U-shaped channel 12. This connecting means may be in the form of a piston rod or rotative screw. A machine tool 20 is carried by the spindle 17 and is of the hollow or gun type and communicates with the hollow spindle 17 so that a coolant or lubricant may be circulated, during operation of the machine, through the spindle and tool.

In the drawings the motor A is shown as of the piston type and this is preferred for reciprocating the support 14 to effect short feed strokes of the spindle 17. However, for long spindle feed strokes, it has been found more efficient to use a motor to rotate a feed screw to effect the reciprocation of the support. Only a general description of motors A and B is considered necessary for the purpose of this invention. Motor A is the well known piston cylinder type in which a power piston is reciprocated within the cylinder by motive hydraulic fluid supplied selectively to end chambers formed by the piston with the cylinder end walls. The motor B is of the vane type wherein the vanes are arranged to rotate, under the influence of the hydraulic fluid, a shaft which, through suitable connecting means, in turn rotates the spindle and tool carried thereby.

The hollow spindle 17 is mounted in the support 14 between front bearing 21 and rear bearing 22 both of which are preferably provided with bearing raceways, as shown in connection with the rear bearing 22, for smooth operation. The gear train 18 is disposed in a chamber 23 formed in the rear face of the support 14 and is closed by a removable face plate 24 while the depending lug 15 of the support 14 is connected to the piston shaft or rod 25 of motor A by a removable connecting screw 26. The shaft 27 extends from motor B and is connected through the gear train 18 to rotate the hollow spindle 17. The coolant or cutting oil is supplied directly to the hollow spindle 17 through communicating recesses in the gear train and face plate 24 by means of flexible hose 28 and a suitable rotary fluid seal 29. The hydraulic motive fluid is admitted to and removed from motor A by hose lines 30 and 31 and the motive fluid is admitted to motor B by one of the hose lines 32 or 33 and removed by the other hose line.

From the above generally described arrangement of the machine assembly, it is seen that motor A and bedplate 11 provides one sub-assembly and that support 14, which mounts the motor B and spindle 17, provides another sub-assembly and that these sub-assemblies may be joined in a complete machine structure by means of the connection 26. These structural features along with the arrangements for supplying the motive fluid and the coolant to the assembled unit provides for great flexibility in the use of the machine.

In Fig. 3 is shown the hydraulic fluid control circuits for the operation of motors A and B, and also the coolant circulating system. The operation of spindle feed motor A and the operation of spindle rotating motor B is effected by means of hydraulic fluid supplied by independent pumps P and $P_1$ respectively operated by an electric motor M. The fluid is circulated from a hydraulic fluid reservoir H, and is returned to the reservoir H during operation of the motors. One set of valves is located between the pump P and motor A providing a spindle reciprocating control circuit and another set of valves is located between pump $P_1$ and motor B providing a spindle rotating control circuit. The valves in the fluid circuit between pump P and motor A are arranged to provide both for automatic and manual control of the advance or forward movement of the spindle 17 and for its automatic return on retraction. The valves in the fluid circuit between pump $P_1$ and motor B are arranged to provide automatic and manual control of the speed of rotation and also the torque of the spindle during the advance movement of the spindle.

During operation of the machine a lubricant or coolant is supplied directly into the hollow spindle by a flexible hose line 28 and through the hollow tool from a coolant reservoir by pump $P_2$ which is driven by another electric motor $M_1$. The coolant after leaving the tool is collected in a sump S which is positioned below the tool to receive the coolant and entrained chips. From the sump S the coolant is returned to the coolant reservoir and prior to recirculation of the coolant through the spindle, any entrained material will, of course, be removed by suitable means.

Although not shown or described in this application, the hydraulic fluid control circuits between the fluid reservoir H and fluid motors A and B and also the controls for the coolant fluid are, in commercial use of the machine, provided with electrical push button control circuits for energization of the electric motors M and $M_1$ and the several automatic solenoid valves in their proper sequential relationship in accordance with the particular operation of the machine. Various interlocks are also provided between certain of the valves to insure the selective or proper supply of motive fluid to motors A and B and the supply of coolant to the spindle. Regardless of the electrical control system used, it is essential in the use of the machine that the particular automatic and manual valve arrangement shown in Fig. 3 be provided in order to readily adapt the machine for the various uses for which it is intended.

Referring first to the reciprocating control circuit between pump P and motor A in the lower portion of Fig. 3, the hydraulic fluid from the reservoir H enters main supply line 101, which is in communication with a solenoid operated four-way valve 102, and is the principal control valve means between the reservoir H and motor A. This valve communicates with branch line 103 for delivery of the motive fluid directly to the chamber F, which is the forward or advance power chamber of motor A, and also communicates with branch line 104 for supplying fluid to chamber R, which is the return power chamber of motor A. The four-way valve 102 is an assembly providing two separate two-way valve units, each of which is operated automatically by a separate solenoid as shown to independently and alternately supply fluid to motor A by branch line 103 or branch line 104.

Branch line 104 is also provided with a solenoid operated two-way valve 105 which is maintained open to supply fluid to or to remove fluid from chamber R during the rapid retraction or rapid advance of spindle 17.

By-pass line 106 is connected to the branch line 104 at either side of the valve 105 and is provided with a manually operated valve 107 permitting an operator to control fluid removal from chamber R for the controlled or slow advance of the spindle when the valve 105 is closed. Thus valve 105 is open to permit free flow of fluid into and out of chamber R through the line 104 when the spindle 17 is rapidly advanced or retracted. Manually operated valve 107 is open at all times during operation of motor A and may be pre-set to bleed off any predetermined volume of fluid from chamber R that is desired, for control of the slow feed rate of the spindle 17 which is suitable for the particular drilling or other operation.

A solenoid operated relief valve 108 is located in an unloading or branch return line 109 and is positioned between the four-way valve assembly 102 and the reservoir H. This valve is closed during the advance or retraction of the spindle but is open to unload the motor or to recycle fluid when motor A is not in operation. Line 110 provides the main return line for directing fluid to the reservoir H during the advance or retraction of the spindle and is alternately in communication with the lines 103 and 104. When one of the valve units in four-way valve 102 is open to supply fluid to the advance or return power chamber of motor A, the other valve unit will be open to return fluid to the reservoir H by supply line 101 and branch return line 109 or by main return line 110. Thus, an automatic means for selectively supplying motive fluid to advance chamber F or return chamber R of motor A and for returning fluid to the reservoir is provided when the spindle 17 is advanced or retracted rapidly and also a manual control means is provided for the slow or controlled advance of the spindle 17.

The fluid flow, during the advance movement of the spindle 17 by motor A will be from power chamber R through line 104, valve 105, line 106 and valve 107, four-way valve assembly 102, return line 110 directly to the reservoir H. During the retraction of the spindle 17, the fluid flow will be from power chamber F through line 103, four-way valve assembly 102, and return line 110 directly to the fluid reservoir H.

The spindle rotating control circuit in the upper portion of Fig. 3 is from reservoir H by pump $P_1$ through flexible fluid supply line 121 to the fluid motor B which effects rotation of the spindle 17. A branch line 122 from fluid supply line 121 having a solenoid operated relief valve 123 therein communicates directly with the reservoir H. The valve 123 will be open when it is necessary to unload motor B and also for the purpose of recycling fluid to the reservoir when motor B is not operating. This valve will be closed to supply fluid to the motor by line 121 for rotation of spindle 17. A second branch line 124 from supply line 121 has a manually operated valve 125 therein which is open at all times and is preset to bleed off any desired volume of fluid from the motor B to the reservoir H regardless of variations in load or pressure and provides the manual control for reducing the speed of rotation of the spindle 17. A manually adjustable back pressure valve 126 is provided in outlet line 127 from the motor B and is in direct communication with reservoir H. This valve 126 is manually operated to maintain a minimum downstream pressure in the outlet line 127 so that when the spindle 17 is advanced by motor A and the machine tool contacts a workpiece, torque is immediately available from the rotating tool and consequently damage to the tool is prevented.

I claim:
1. A hydraulic system for operating a machine tool which comprises a first fluid motor and a first hydraulic circuit for reciprocating the tool; a second fluid motor and a second fluid circuit for rotating the tool; a hydraulic fluid reservoir; a first pumping means for circulating fluid through the first circuit and a second pumping means for circulating fluid through the second circuit;

said first circuit including a main supply line from the first pumping means and a main return line to the reservoir, a first branch line and a second branch line in communication with the first motor, selector valve means between said branch lines and said main supply and said main return lines, said selector valve means being operable in one position to provide communication between the first branch line and the main supply line and simultaneously therewith to provide communication between the second branch line and the main return line for effecting the rapid advance movement of the tool, and being operable in another position to provide communication between the second branch line and the main supply line and simultaneously therewith to provide communication between the first branch line and the main return line for effecting the rapid return movement of the tool, a valve in the second branch line which is open during the rapid advance and rapid return movement of the tool, a bleed-off line which is operative when the last mentioned valve is closed for metering fluid from said second branch line to provide for slow and regulated advance movement of the tool; said second hydraulic circuit including a main supply line from the second pumping means to the second motor and a main return line from said motor to the reservoir for rapid rotation of the tool, a bleed-off line for metering fluid from the main supply line to effect slow or reduced speed of rotation of the tool and a back pressure regulating valve in the main return line which is operable to apply torque to the tool substantially at the instant the advance movement of the tool by the first motor contacts a workpiece to thereby prevent damage to the tool.

2. A hydraulic system as in claim 1 further characterized by the bleed-off line in the first circuit providing a by-pass for the valve in the second branch line for returning fluid to the reservoir and the bleed-off line in the second circuit being in communication with the reservoir for returning fluid thereto.

3. A hydraulic system as in claim 1 further characterized by a valved recycle line between the main supply line in the first circuit and the reservoir and a valved recycle line between the main supply in the second circuit and the reservoir for permitting cycling of the fluid to the reservoir when at least one of the motors is not being operated.

4. A hydraulic system as in claim 1 further characterized by the first fluid motor being of the reciprocating piston type having an advance and a return power chamber and wherein the first branch line and the second branch line of the first fluid circuit are respectively in communication with the advance and return power chambers.

References Cited in the file of this patent

UNITED STATES PATENTS

| | | |
|---|---|---|
| 1,749,982 | Nesbitt | Mar. 11, 1930 |
| 1,911,138 | Clute et al. | May 23, 1933 |
| 1,990,052 | Sosa | Feb. 5, 1935 |
| 2,014,679 | Eckroate | Sept. 17, 1935 |
| 2,215,257 | Svenson | Sept. 17, 1940 |
| 2,233,571 | Alden | Mar. 4, 1941 |
| 2,285,069 | Vickers | June 2, 1942 |
| 2,459,902 | Tucker | Jan. 25, 1949 |